(12) United States Patent
Uematsu

(10) Patent No.: US 9,595,897 B2
(45) Date of Patent: Mar. 14, 2017

(54) MOTOR CONTROL DEVICE FOR CONTROLLING CURRENT PHASE ON DQ/THREE-PHASE COORDINATES

(71) Applicant: FANUC CORPORATION, Yamanashi (JP)

(72) Inventor: Hidetoshi Uematsu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/926,344

(22) Filed: Oct. 29, 2015

(65) Prior Publication Data

US 2016/0126871 A1    May 5, 2016

(30) Foreign Application Priority Data

Oct. 31, 2014    (JP) ................................ 2014-222870

(51) Int. Cl.
| | |
|---|---|
| H02P 6/14 | (2016.01) |
| H02P 21/00 | (2016.01) |
| H02P 27/08 | (2006.01) |
| H02P 21/10 | (2016.01) |

(52) U.S. Cl.
CPC .......... *H02P 6/142* (2013.01); *H02P 21/0089* (2013.01); *H02P 21/0096* (2013.01); *H02P 21/10* (2013.01); *H02P 27/08* (2013.01)

(58) Field of Classification Search
CPC .. H02P 6/14; H02P 21/00; H02P 27/08; H02P 21/0089
USPC ............................. 318/400.02, 400.01, 700
See application file for complete search history.

(56) References Cited

U.S. PATENT DOCUMENTS

| | | | |
|---|---|---|---|
| 2014/0145654 A1* | 5/2014 | Zhang ..................... | H02P 21/14 |
| | | | 318/400.02 |
| 2014/0346983 A1* | 11/2014 | Kato ................... | H02P 21/0089 |
| | | | 318/400.02 |
| 2015/0244298 A1* | 8/2015 | Takaki .................... | H02P 21/32 |
| | | | 318/400.02 |

FOREIGN PATENT DOCUMENTS

| | | | | |
|---|---|---|---|---|
| JP | 9023700 | A | 1/1997 | |
| JP | 9084400 | A | 3/1997 | |
| JP | 9298899 | A | 11/1997 | |
| JP | 2001224195 | A | 8/2001 | |
| JP | 2005094826 | A | 4/2005 | |
| JP | 2006020397 | A | 1/2006 | |
| JP | WO 2013058109 | A1 * | 4/2013 | .......... H02P 21/0089 |
| JP | 2013090545 | A | 5/2013 | |

OTHER PUBLICATIONS

English translation of Abstract for Japanese Publication No. 2013090545, published May 13, 2013, 1 page.
(Continued)

*Primary Examiner* — Kawing Chan
(74) *Attorney, Agent, or Firm* — Fredrikson & Byron, P.A.

(57) ABSTRACT

A motor control device for controlling a three-phase AC motor by using dq-three-phase coordinate conversion includes a phase correction amount calculation unit for calculating a phase correction amount by using a detected motor speed and a q-axis current command initial value, a rotor phase angle correction unit for adding or subtracting the phase correction amount to or from a detected rotor phase angle of the motor to calculate a corrected rotor phase angle, and a coordinate conversion unit for performing coordinate conversion between parameters on a dq coordinate system and parameters on a three-phase coordinate system on the basis of the corrected rotor phase angle.

5 Claims, 10 Drawing Sheets

(56) References Cited

OTHER PUBLICATIONS

English translation of Abstract for Japanese Publication No. 2005094826, published Apr. 7, 2005, 1 page.
English translation of Abstract for Japanese Publication No. 2001224195, published Aug. 17, 2001, 1 page.
English Abstract for Japanese Publication No. 09-084400 A, published Mar. 28, 1997, 1 pg.
English Abstract for Japanese Publication No. 2006-020397 A, published Jan 19, 2006, 2 pgs.
English Abstract for Japanese Publication No. 09-298899 A, published Nov. 18, 1997, 1 pg.
English Abstract for Japanese Publication No. 09-023700 A, published Jan. 21, 1997, 1 pg.
Takeda, Yoji et al. "Design and Control of an embedded magnetic Synchronous Motor," 7th print of 1st edition, Ohmsha, 2007, pp. 16-17 and 26-27.

* cited by examiner

MOTOR CONTROL DEVICE FOR CONTROLLING CURRENT PHASE ON DQ/THREE-PHASE COORDINATES

FIELD OF THE INVENTION

The present invention relates to a motor control device for controlling a three-phase AC motor by using dq-three-phase coordinate conversion.

DESCRIPTION OF THE RELATED ART

There is a known motor control device for performing current vector control of a three-phase AC permanent magnet synchronous motor (PMSM) (which hereinafter may be referred to simply as "motor") using dq-three-phase coordinate conversion, as described in Yoji Takeda, Nobuyuki Matsui, Shigeo Morimoto, and Yukio Honda, "Design and Control of an embedded Magnetic Synchronous Motor", 7th print of 1st edition, Ohmsha, 2007, pp. 16-17 and 26-27. FIG. 10 is a block diagram depicting a control loop of a typical motor control device for controlling a three-phase AC motor by using dq-three-phase coordinate conversion. When the magnetic pole direction of a rotor is set as a d axis and an axis electrically and magnetically orthogonal to the d axis is set as a q axis in a dq coordinate control system, d-axis current represents an excitation current component that is used to generate magnetic flux, and q-axis current represents an armature current component corresponding to load torque. In FIG. 10, $i_d{}^*$ represents d-axis current command, $i_q{}^*$ represents q-axis current command, $L_d$ represents d-axis inductance of the motor, $L_q$ represents q-axis inductance of the motor, $\Psi_a$ represents stator interlinkage magnetic flux, $V_d$ represents d-axis voltage of the motor, $V_q$ represents q-axis voltage of the motor, $i_d$ represents d-axis current of the motor, $i_q$ represents q-axis current of the motor, J represents inertia of the motor, $K_t$ represents coefficient, and $\omega$ represents angular velocity of the rotor of the motor.

According to an input d-axis current command $i_d{}^*$ and an input q-axis current command $i_q{}^*$, a motor control device 100 outputs a drive power for driving the motor. Thereby, a d-axis voltage $V_d$ and a q-axis voltage $V_q$ are applied to the motor to cause a d-axis current $i_d$ and a q-axis current $i_q$ to flow thereto. In this case, a voltage equation represented by an equation 1 holds among the d-axis voltage $V_d$, the q-axis voltage $V_q$, the d-axis current $i_d$, and the q-axis current $i_q$ of the motor:

$$\begin{bmatrix} V_d \\ V_q \end{bmatrix} = \begin{bmatrix} R+sL_d & -\omega L_q \\ \omega L_d & R+sL_q \end{bmatrix} \begin{bmatrix} i_d \\ i_q \end{bmatrix} + \begin{bmatrix} 0 \\ \omega \Psi_a \end{bmatrix} \quad (1)$$

In addition, when the number of pole pairs of the motor is represented by $P_n$, torque T of the motor can be calculated by a torque equation represented by an equation 2:

$$T = P_n\{\Psi_a i_q + (L_q - L_d) i_d i_q\} \quad (2)$$

Additionally, in FIG. 10, although the voltage and current applied to the motor are represented on the dq coordinate system, a voltage that is actually applied to the motor is an AC value on a three-phase coordinate system. In other words, the three-phase AC voltage is applied to the motor by the motor control device, as a result of which a three-phase AC current flows through the motor. In the motor control device performing the current vector control, the three-phase to dq conversion of a detected three-phase AC motor current is performed to perform d-axis control and q-axis control, and then each of d-axis and q-axis commands obtained by the d-axis control and the q-axis control is subjected to dq to three-phase conversion to generate a three-phase AC voltage command. In other words, in the motor control device, internal processing thereof involves a process of coordinate conversion between the parameters on the dq coordinate system and the parameters on the three-phase coordinate system.

FIG. 11 is a block diagram illustrating a dq-three-phase coordinate conversion process in a typical motor control device. In FIG. 11, the motor control device that drives a motor 2 includes a d-axis controller 101, a q-axis controller 102, a dq to three-phase conversion unit 103, a PWM inverter unit 104, and a three-phase to dq conversion unit 105.

According to an input d-axis current command $i_d{}^*$ and an input q-axis current command $i_q{}^*$, the controllers 101 and 102 generate a d-axis voltage command $V_d{}^*$ and a q-axis voltage command $V_q{}^*$, respectively. The dq to three-phase conversion unit 103 converts the d-axis voltage command $V_d{}^*$ and the q-axis voltage command $V_q{}^*$ on the dq coordinate system into three-phase voltage commands $V_u{}^*$, $V_v{}^*$, and $V_w{}^*$ on the three-phase coordinate system according to an equation 3:

$$\begin{bmatrix} V_u^* \\ V_v^* \\ V_w^* \end{bmatrix} = \sqrt{\frac{2}{3}} \begin{bmatrix} 1 & 0 \\ -1/2 & -\sqrt{3}/2 \\ -1/2 & \sqrt{3}/2 \end{bmatrix} \begin{bmatrix} \cos\theta & \sin\theta \\ -\sin\theta & \cos\theta \end{bmatrix} \begin{bmatrix} V_d^* \\ V_q^* \end{bmatrix} \quad (3)$$

The PMW inverter unit 104 compares the three-phase voltage commands $V_u{}^*$, $V_v{}^*$, and $V_w{}^*$ with a triangular wave carrier signal having a predetermined carrier frequency to generate a PWM control signal for controlling switching operation of semiconductor switching elements in a main circuit unit (not shown) of the PWM inverter unit 104. The main circuit unit (not shown) of the PWM inverter unit 104 is, for example, composed of a full-bridge circuit including the switching elements and diodes connected in inverse-parallel thereto. In the main circuit unit of the PWM inverter unit 104, the switching operation of the internal switching elements is controlled by the PWM control signal to allow three-phase voltages $V_u$, $V_v$, and $V_w$ to be output. The three-phase voltages $V_u$, $V_v$, and $V_w$ applied to the motor 2 cause three-phase AC currents $i_u$, $i_v$, and $i_w$ to flow to the motor 2, and the currents are detected by a current detector (not shown). The three-phase to dq conversion unit 104 converts the three-phase AC currents $i_u$, $i_v$, and $i_w$ on the three-phase coordinate system into a d-axis current $i_d$ and a q-axis current $i_q$ on the dq coordinate system according to an equation 4 and feeds back the currents to the d-axis controller 101 and the q-axis controller 102:

$$\begin{bmatrix} i_d \\ i_q \end{bmatrix} = \sqrt{\frac{2}{3}} \begin{bmatrix} \cos\theta & -\sin\theta \\ \sin\theta & \cos\theta \end{bmatrix} \begin{bmatrix} 1 & -1/2 & -1/2 \\ 0 & -\sqrt{3}/2 & \sqrt{3}/2 \end{bmatrix} \begin{bmatrix} i_u \\ i_v \\ i_w \end{bmatrix} \quad (4)$$

The d-axis controller 101 generates a d-axis voltage command $V_d{}^*$ by using the input d-axis current command $i_d{}^*$ and the fed-back d-axis current $i_d$. In addition, the q-axis controller 102 generates a q-axis voltage command $V_q^*$ by using the input q-axis current command $i_q^*$ and the fed-back d-axis current $i_q$.

In addition, as described in "Design and Control of Interior Magnet Synchronous Motor", a permanent magnet synchronous motor (PMSM) that obtains field control by a permanent magnet cannot directly control field system magnetic flux, unlike a winding-field type synchronous motor, but can use "flux-weakening control" in which magnetic flux in a d-axis direction is reduced using a demagnetization effect due to d-axis armature reaction by causing a negative d-axis current to flow. It is generally known that in order to suppress motor terminal voltage to a limit value of $V_{0m}$ or less by the flux-weakening control, an equation 5 may be used for d-axis current.

$$i_d = \frac{-\Psi_a + \sqrt{\left(\frac{V_{om}}{\omega}\right)^2 - (L_q i_q)^2}}{L_d} \quad (5)$$

For example, as described in Japanese Laid-open Patent Publication No. H09-84400, a technique has been proposed for current control of a servo motor by DQ conversion. In this technique, current is not supplied to d-phase but only to q-phase during a speed range where a rotational speed of the servo motor is not high, and a reactive current is supplied to the d-phase only at a time of high-speed rotation of the servo motor to reduce the terminal voltage of the motor so that the reactive current is reduced in the range where no voltage saturation occurs. Thereby, heat generation due to the effective current is suppressed to allow stable rotation of the motor even at high speed.

In addition, for example, as described in Japanese Laid-open Patent Publication No. 2006-20397 a technique has been proposed for controlling a synchronous electric motor with a permanent magnet. In the technique, a DC link voltage of a direct current obtained by rectifying an AC power supply voltage or input voltage that is input to a power amplifier is measured. Then, according to the power supply voltage, a reactive current (a d-axis current) or a current control phase advance amount is changed so as to directly perform reactive current control and phase control according to change in the input power supply voltage.

In addition, for example, as described in Japanese Laid-open Patent Publication No. H09-298899, a technique has been proposed for correcting magnetic saturation. In the technique, a d-phase current in a direction of magnetic flux generated by a field system and a q-phase current orthogonal thereto are obtained from a drive current and a rotor phase of an AC servo motor by dq conversion. The d-phase current is set to zero and the q-phase current is set as a current command to use a current control mode for performing current control in a DC mode. In the DC-mode current control, by advancing the phase of the q-phase current command that is an active component of the current command at an occurrence of magnetic saturation, the influence of magnetic saturation is suppressed to reduce torque reduction.

In addition, for example, as described in Japanese Laid-open Patent Publication No. H09-23700, a technique has been proposed for controlling current of a servo motor that is controlled by dq conversion. In the technique, an angle corresponding to a delay in a current loop is obtained as a correction angle to correct a phase angle using the correction angle. Using the corrected phase angle, coordinate conversion from a three-phase coordinate system into a dq coordinate system or coordinate conversion from a dq coordinate system into a three-phase coordinate system in dq conversion is performed, thereby compensating for the delay in the current loop.

As described above, the flux-weakening control is performed in permanent magnet synchronous motors (PMSM). However, as indicated in the equation 5, the calculation equation is complicated and a calculation process takes time.

SUMMARY

In view of the above problem, it is an object of the present invention to provide a motor control device that shortens a calculation process time in controlling a three-phase AC motor by using dq-three-phase coordinate conversion.

In order to achieve the above object, a motor control device for controlling a three-phase AC motor by using dq-three-phase coordinate conversion includes a phase correction amount calculation unit for calculating a phase correction amount by using a detected motor speed and a q-axis current command initial value, a rotor phase angle correction unit for adding or subtracting the phase correction amount to or from a detected rotor phase angle of the motor to calculate a corrected rotor phase angle, and a coordinate conversion unit for performing coordinate conversion between parameters on a dq coordinate system and parameters on a three-phase coordinate system on a basis of the corrected rotor phase angle.

In the above motor control device, the phase correction amount calculation unit may include a storage unit for storing a speed coefficient $N_A$, a first reference speed $N_B$, a phase correction amount limit value $N_L$, a current coefficient $T_A$, and a reference current rate $T_B$ as predetermined parameters; a speed correction term calculation unit for calculating a speed correction term on a basis of:

$$\text{Speed correction value} = \min[N_A \times \max\{0, (N-N_B)\}, N_L] \quad (6)$$

where N represents the motor speed;
a current correction term calculation unit for calculating a current correction term on a basis of:

$$\text{Current correction value} = T_A \times \min[1, \max\{0, (T_r - T_B)\}] \quad (7)$$

where $T_r$ represents an initial q-axis current command rate that is a percentage of a q-axis current command initial value with respect to a maximum current outputtable by an inverter that converts DC power into AC power to supply the AC power as drive power for the motor; and an output unit for outputting, as the phase correction amount, a value obtained by multiplying the speed correction term and the current correction term together.

In addition, the storage unit may further store a reference voltage as a predetermined parameter, and the phase correction amount calculation unit may include a correction unit for correcting the speed coefficient, the first reference speed, and the phase correction amount limit value, respectively, read out from the storage unit, by using a DC voltage value detected on a DC side of the inverter and the reference voltage pre-stored in the storage unit.

In addition, the motor control device may further include a d-axis current command initial value calculation unit for calculating a d-axis current command initial value including a function that uses the motor speed as an independent variable.

The d-axis current command initial value calculation unit may calculate the d-axis current command initial value on a basis of:

$$\text{Initial value of } d\text{-axis current command} = \max\{0, I_{DA} \times (N - I_{DB})\} \quad (8)$$

where $I_{DA}$ represents a predetermined d-axis current command initial value coefficient and $I_{DB}$ represents a predetermined second reference speed.

Additionally, the rotor phase angle correction unit may further adds or subtract, to or from the corrected rotor phase angle, a phase angle corresponding to a time delay in a current control loop that controls so that a current that flows to the motor follows a current command, a phase angle corresponding to a phase advance of a q-axis current command necessary to maximize torque of the motor, or both of the phase angles to calculate a new corrected rotor phase angle that is used for the coordinate conversion by the coordinate conversion unit.

The present invention can achieve a motor control device that shortens a calculation process time in controlling a three-phase AC motor by using dq-three-phase coordinate conversion. Conventionally, in order to control a permanent magnet synchronous motor (PMSM), the "flux-weakening control" using a negative d-axis current has been used. However, there has been a problem in that the calculation equation used for the flux-weakening control is complicated and a calculation process takes time. On the other hand, the present invention does not use the complicated calculation equation specific to flux-weakening control and uses, as a control parameter, a phase correction amount that is used for correcting a rotor phase angle to drive and control a permanent magnet synchronous motor (PMSM). Thus, the content of the calculation process is easier to perform than the conventional flux-weakening control, thus allowing the calculation process time to be shortened.

BRIEF DESCRIPTION OF THE DRAWINGS

The present invention will be more clearly understood by referring to the accompanying drawings in which.

DETAILED DESCRIPTION

Hereinafter, a description will be given of a motor control device for controlling a current phase on dq/three-phase coordinates, with reference to the drawings. However, it is to be understood that the present invention is not limited to embodiments described by the drawings and the description below.

Figure 1:
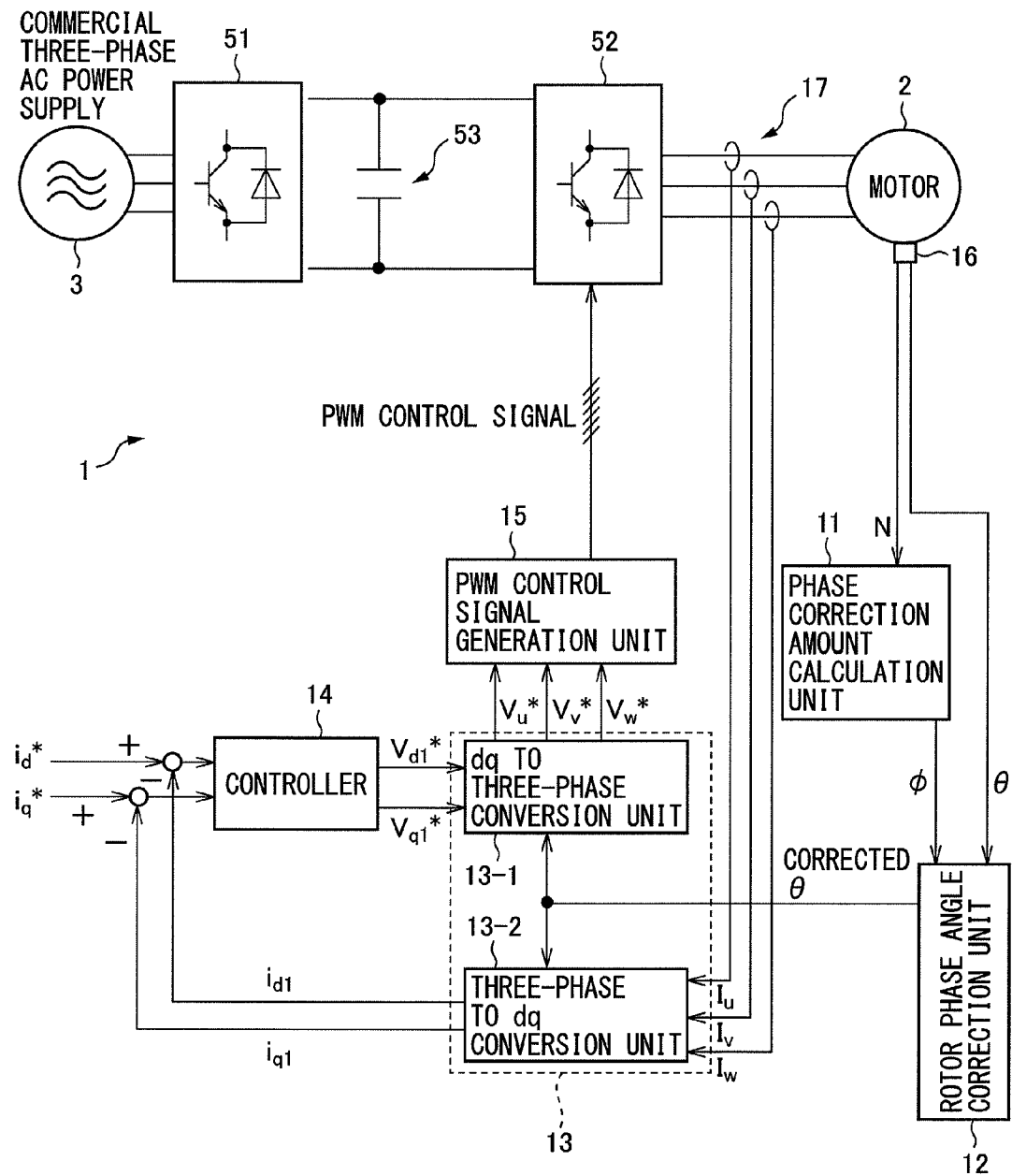
FIG. 1 is a block diagram depicting a motor control device according to a first embodiment of the present invention.

FIG. 1 is a block diagram depicting a motor control device according to a first embodiment of the present invention. Hereinbelow, constituent elements denoted by the same reference signs among different drawings are assumed to be those having the same functions. In the description, there will be given an example in which a commercial three-phase AC power supply 3 is connected to an AC power supply side of a motor control device 1 (i.e., an AC power supply side of a rectifier 51), and a three-phase permanent magnet synchronous motor (PMSM) 2 (hereinafter referred to simply as "motor") is connected to an AC motor side of the motor control device 1 (i.e., an AC motor side of an inverter 52).

The motor control device 1 includes the rectifier 51 and the inverter (inverse converter) 52 connected to a DC link that is a DC side of the rectifier 51. In addition, the DC link is provided with a DC capacitor 53. The circuit structures of the rectifier 51 and the inverter 52 do not limit the present invention. The rectifier 51 is, for example, formed by a diode rectifier or a PWM rectifier. The inverter 52 is, for example, formed as a PWM inverter formed by a full-bridge circuit of switching elements and diodes connected in inverse-parallel thereto. Examples of the switching elements include IGBT, thyristor, GTO (Gate Turn-OFF thyristor), and transistor.

The motor control device 1 according to the first embodiment includes a phase correction amount calculation unit 11 for calculating a phase correction amount φ by using a detected motor speed and a q-axis current command initial value, a rotor phase angle correction unit 12 for adding or subtracting the phase correction amount ϕ to or from a detected rotor phase angle θ of the motor 2 to calculate a corrected rotor phase angle, and a coordinate conversion unit 13 for performing coordinate conversion between parameters on a dq coordinate system and parameters on a three-phase coordinate system on the basis of the corrected rotor phase angle. The coordinate conversion unit 13 includes a dq to three-phase conversion unit 13-1 and a three-phase to dq conversion unit 13-2.

In addition, as with the conventional art, the motor control device 1 includes a controller 14 and a PWM control signal generation unit 15. The controller 14 generates a d-axis voltage command $V_{d1}^*$ and a q-axis voltage command $V_{q1}^*$, respectively, by using an input d-axis current command $i_d^*$ and an input q-axis current command $i_q^*$, and a d-axis current $i_{d1}$ and a q-axis current $i_{q1}$ output from a three-phase to dq conversion unit 13-2 that will be described later. A method itself for generating the d-axis voltage command $V_{d1}^*$ and the q-axis voltage command $V_{q1}^*$ by the controller 14 does not limit the present invention and may be achieved, for example, by a known method. The PWM control signal generation unit 15 compares three-phase voltage commands $V_u^*$, $V_v^*$, and $V_w^*$ output from a dq to three-phase conversion unit 13-1 that will be described later with a triangular wave carrier signal having a predetermined carrier frequency to generate a PWM control signal for controlling switching operation of semiconductor switching elements in the inverter 52. A PWM control signal generation method itself by the PWM control signal generation unit 15 does not limit the present invention and may be achieved, for example, by a known method.

Next the phase correction amount calculation unit 11, the rotor phase angle correction unit 12, and the coordinate conversion unit 13 will be described.

In the first embodiment, the rotor phase angle correction unit 12 corrects in advance a rotor phase angle that is used for a coordinate conversion process by the coordinate conversion unit 13, and adds or subtracts the phase correction amount ϕ to or from the rotor phase angle θ of the motor 2 detected by a speed detector 16 to calculate a corrected rotor phase angle. A specific method for calculating the phase correction amount ϕ will be described later.

The dq to three-phase conversion unit 13-1 in the first embodiment converts the d-axis voltage command $V_{d1}^*$ and the q-axis voltage command $V_{q1}^*$ on the dq coordinate system into the three-phase voltage commands $V_u^*$, $V_v^*$, and $V_w^*$ on the three-phase coordinate system on the basis of a corrected rotor phase angle output from the rotor phase angle correction unit 12. The corrected rotor phase angle that is used for the dq to three-phase coordinate conversion process by the dq to tree-phase conversion unit 13-1 is generated by adding the phase correction amount ϕ to the rotor phase angle θ of the motor 2 detected by the speed detector 16. The dq to three-phase coordinate conversion process by the dq to tree-phase conversion unit 13-1 is executed using the rotor phase angle θ according to an equation 9:

$$\begin{bmatrix} V_u^* \\ V_v^* \\ V_w^* \end{bmatrix} = \sqrt{\frac{2}{3}} \begin{bmatrix} 1 & 0 \\ -1/2 & -\sqrt{3}/2 \\ -1/2 & \sqrt{3}/2 \end{bmatrix} \begin{bmatrix} \cos(\theta+\phi) & \sin(\theta+\phi) \\ -\sin(\theta+\phi) & \cos(\theta+\phi) \end{bmatrix} \begin{bmatrix} V_d^* \\ V_q^* \end{bmatrix} \quad (9)$$

By applying the addition theorem of trigonometric functions, the equation 9 can be modified as in an equation 10:

$$\begin{bmatrix} V_u^* \\ V_v^* \\ V_w^* \end{bmatrix} = \sqrt{\frac{2}{3}} \begin{bmatrix} 1 & 0 \\ -1/2 & -\sqrt{3}/2 \\ -1/2 & \sqrt{3}/2 \end{bmatrix} \begin{bmatrix} \cos(\theta) & \sin(\theta) \\ -\sin(\theta) & \cos(\theta) \end{bmatrix} \begin{bmatrix} \cos(\phi) & \sin(\phi) \\ -\sin(\phi) & \cos(\phi) \end{bmatrix} \begin{bmatrix} V_d^* \\ V_q^* \end{bmatrix} \quad (10)$$

Parameters $V_{d1}^*$ and $V_{q1}^*$ are as represented by equation 11:

$$\begin{bmatrix} V_{d1}^* \\ V_{q1}^* \end{bmatrix} = \begin{bmatrix} \cos(\phi) & \sin(\phi) \\ -\sin(\phi) & \cos(\phi) \end{bmatrix} \begin{bmatrix} V_d^* \\ V_q^* \end{bmatrix} \quad (11)$$

The equation 11 is substituted into the equation 10 to obtain an equation 12:

$$\begin{bmatrix} V_u^* \\ V_v^* \\ V_w^* \end{bmatrix} = \sqrt{\frac{2}{3}} \begin{bmatrix} 1 & 0 \\ -1/2 & -\sqrt{3}/2 \\ -1/2 & \sqrt{3}/2 \end{bmatrix} \begin{bmatrix} \cos(\theta) & \sin(\theta) \\ -\sin(\theta) & \cos(\theta) \end{bmatrix} \begin{bmatrix} V_{d1}^* \\ V_{q1}^* \end{bmatrix} \quad (12)$$

A comparison between the equation 9 and the equation 12 indicates that the dq to three-phase coordinate conversion process that is executed by the dq to three-phase conversion unit 13-1 according to the equation 9 is equivalent to one that is executed on the $V_{d1}^*$ and the $V_{q1}^*$ obtained by advancing the d-axis voltage command $V_d^*$ and the q-axis voltage command $V_q^*$ by the phase correction amount ϕ, as depicted in the equation 12.

On the other hand, the three-phase to dq conversion unit 13-2 in the first embodiment converts the three-phase AC currents $i_u$, $i_v$, and $i_w$ on the three-phase coordinate system, detected by a current detector 17, into the d-axis current $i_d$ and the q-axis current $i_q$ on the dq coordinate system on the basis of a corrected rotor phase angle output from the rotor phase angle correction unit 12. The corrected rotor phase angle that is used for the three-phase to dq coordinate conversion process by the three-phase to dq conversion unit 13-2 is generated by subtracting the phase correction amount ϕ from the rotor phase angle θ of the motor 2 detected by the speed detector 16. Using the generated rotor phase angle θ, the three-phase to dq coordinate conversion process by the three-phase to dq conversion unit 13-2 is executed according to an equation 13:

$$\begin{bmatrix} i_d \\ i_q \end{bmatrix} = \sqrt{\frac{2}{3}} \begin{bmatrix} \cos(\theta-\phi) & -\sin(\theta-\phi) \\ \sin(\theta-\phi) & \cos(\theta-\phi) \end{bmatrix} \begin{bmatrix} 1 & -1/2 & -1/2 \\ 0 & -\sqrt{3}/2 & \sqrt{3}/2 \end{bmatrix} \begin{bmatrix} i_u \\ i_v \\ i_w \end{bmatrix} \quad (13)$$

By applying the addition theorem of trigonometric functions, the equation 13 can be modified as in an equation 14:

$$\begin{bmatrix} i_d \\ i_q \end{bmatrix} = \sqrt{\frac{2}{3}} \begin{bmatrix} \cos(-\phi) & -\sin(-\phi) \\ \sin(-\phi) & \cos(-\phi) \end{bmatrix} \begin{bmatrix} \cos(\theta) & -\sin(\theta) \\ \sin(\theta) & \cos(\theta) \end{bmatrix} \quad (14)$$

$$\begin{bmatrix} 1 & -1/2 & -1/2 \\ 0 & -\sqrt{3}/2 & \sqrt{3}/2 \end{bmatrix} \begin{bmatrix} i_u \\ i_v \\ i_w \end{bmatrix}$$

By multiplying both sides of the equation 14 by an inverse matrix to a matrix of the phase correction amount φ, the equation 14 can be modified as in an equation 15:

$$\begin{bmatrix} \cos(\phi) & \sin(\phi) \\ -\sin(\phi) & \cos(\phi) \end{bmatrix} \begin{bmatrix} i_d \\ i_q \end{bmatrix} = \sqrt{\frac{2}{3}} \begin{bmatrix} \cos(\theta) & -\sin(\theta) \\ \sin(\theta) & \cos(\theta) \end{bmatrix} \begin{bmatrix} 1 & -1/2 & -1/2 \\ 0 & -\sqrt{3}/2 & \sqrt{3}/2 \end{bmatrix} \begin{bmatrix} i_u \\ i_v \\ i_w \end{bmatrix} \quad (15)$$

Parameters $i_{d1}$ and $i_{q1}$ are as represented by equation 16:

$$\begin{bmatrix} i_{d1} \\ i_{q1} \end{bmatrix} = \begin{bmatrix} \cos(\phi) & \sin(\phi) \\ -\sin(\phi) & \cos(\phi) \end{bmatrix} \begin{bmatrix} i_d \\ i_q \end{bmatrix} \quad (16)$$

The equation 16 is substituted into the equation 15 to obtain an equation 17:

$$\begin{bmatrix} i_{d1} \\ i_{q1} \end{bmatrix} = \sqrt{\frac{2}{3}} \begin{bmatrix} \cos(\theta) & -\sin(\theta) \\ \sin(\theta) & \cos(\theta) \end{bmatrix} \begin{bmatrix} 1 & -1/2 & -1/2 \\ 0 & -\sqrt{3}/2 & \sqrt{3}/2 \end{bmatrix} \begin{bmatrix} i_u \\ i_v \\ i_w \end{bmatrix} \quad (17)$$

A comparison between the equation 13 and the equation 17 indicates that the $i_{d1}$ and the $i_{q1}$ to be obtained by advancing the d-axis current $i_d$ and the q-axis current $i_q$ by the phase correction amount φ have been calculated as depicted in the equation 17 by the three-phase to dq coordinate conversion process by the three-phase to dq conversion unit 13-2 that is executed on the three-phase AC currents $i_u$, $i_v$, and $i_w$ on the three-phase coordinate system on the basis of the equation 13.

Figure 2:
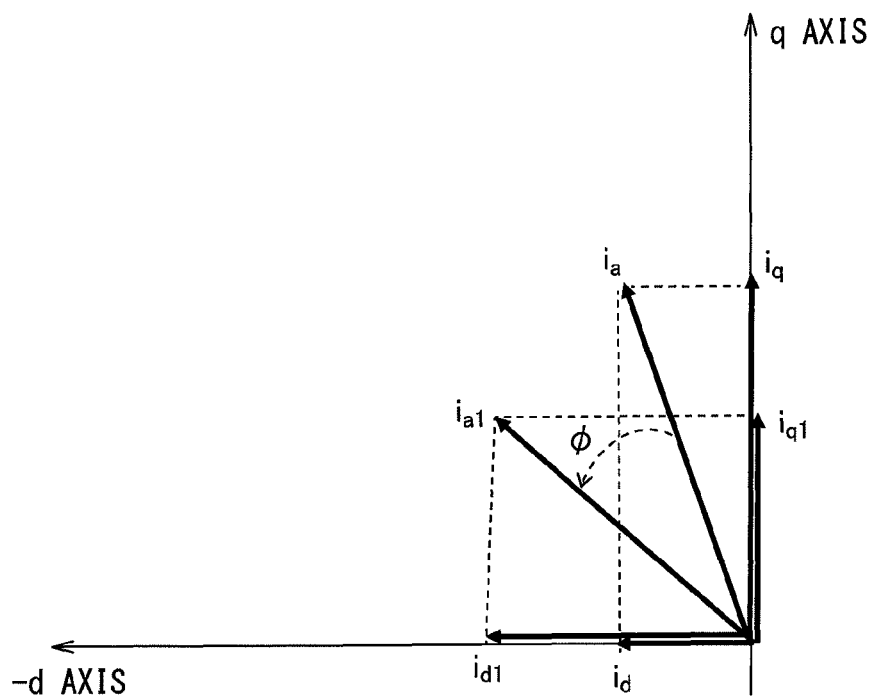
FIG. 2 is a vector diagram illustrating a three-phase to dq coordinate conversion process using a corrected rotor phase angle.

FIG. 2 is a vector diagram illustrating a three-phase to dq coordinate conversion process using a corrected rotor phase angle. When the three-phase AC currents $i_u$, $i_v$, and $i_w$ on the three-phase coordinate system are subjected to a three-phase to dq coordinate conversion, there are obtained the d-axis current $i_d$ and the q-axis current $i_q$ on the dq coordinate system. In this case, current vector is represented by $i_a$. On the other hand, when the three-phase AC currents $i_u$, $i_v$, and $i_w$ on the three-phase coordinate system are subjected to a three-phase to dq coordinate conversion by using a corrected rotor phase angle obtained by subtracting the phase correction amount φ from the rotor phase angle θ (i.e., one obtained by advancing the rotor phase angle θ by the phase correction amount φ), the d-axis current $i_{d1}$ and the q-axis current $i_{q1}$ on the dq coordinate system are obtained. In this case, the current vector is represented by $i_{a1}$. In other words, it can be understood that changing the magnitude of the phase correction amount φ allows the magnitude of the d-axis current $i_d$ to be changed accordingly. Thus, the present invention utilizes the characteristics to use the phase correction amount φ that is used for correcting the rotor phase angle θ, as a control parameter for driving and controlling a permanent magnet synchronous motor (PMSM).

Specifically, according to the first embodiment, the rotor phase angle correction unit 12 generates a corrected rotor phase angle for the three-phase to dq conversion unit 13-2 by subtracting the phase correction amount φ from the rotor phase angle θ detected by the speed detector 16. Using the corrected rotor phase angle, the three-phase to dq conversion unit 13-2 converts the three-phase AC current $i_u$, $i_v$, and $i_w$ on the three-phase coordinate system, detected by the current detector 17, into the d-axis current $i_{d1}$ and the q-axis current $i_{q1}$ on the dq coordinate system according to the equation 17. As described with reference to FIG. 2, the d-axis current $i_{d1}$ and the q-axis current $i_{q1}$ obtained by the three-phase to dq conversion process using the corrected rotor phase angle are in the state of being advanced from the rotor phase angle θ by the phase correction amount φ (i.e., the state of being advanced by the phase correction amount φ as compared to the d-axis current $i_d$ and the q-axis current $i_q$ obtained by a three-phase to dq conversion process using the rotor phase angle θ not subjected to phase correction). The controller 14 generates the d-axis voltage command $V_{d1}^*$ and the q-axis voltage command $V_{q1}^*$, respectively, by using the input d-axis current command $i_d^*$ and the input q-axis current command $i_q^*$, and the d-axis current $i_{d1}$ and the q-axis current $i_{q1}$ output from the three-phase to dq conversion unit 13-2. The d-axis voltage command $V_{d1}^*$ and the q-axis voltage command $V_{q1}^*$ are in the state of being advanced from the rotor phase angle θ by the phase correction amount φ, as with the d-axis current $i_{d1}$ and the q-axis current $i_{q1}$. Additionally, the rotor phase angle correction unit 12 generates a corrected rotor phase angle for the dq to three-phase conversion unit 13-1 by adding the phase correction amount φ to the rotor phase angle θ detected by the speed detector 16. Using the corrected rotor phase angle, the dq to three-phase conversion unit 13-1 converts the d-axis voltage command $V_{d1}^*$ and the q-axis voltage command $V_{q1}^*$ on the dq coordinate system into the three-phase voltage commands $V_u^*$, $V_v^*$, and $V_w^*$ on the three-phase coordinate system according to the equation 12. As described above, the d-axis voltage command $V_{d1}^*$ and the q-axis voltage command $V_{q1}^*$ have been in the state of being advanced from the rotor phase angle θ by the phase correction amount φ. However, by executing the dq to three-phase conversion process based on the equation 12, the above "state of being advanced from the rotor phase angle θ by the phase correction amount φ" is cancelled, thereby returning to the initial rotor phase angle θ. After this, the PWM control signal generation unit 15 compares the three-phase voltage commands $V_u^*$, $V_v^*$, and $V_w^*$ output from the dq to three-phase conversion unit 13-1 with a triangular wave carrier signal having a predetermined carrier frequency to generate a PWM control signal for controlling switching operation of semiconductor switching elements in the inverter 52. The inverter 52 causes the switching elements thereinside to be switch-operated on the basis of the PWM control signal generated by the PWM control signal generation unit 15 to convert a DC power that is supplied from a DC link side into a three-phase AC power having a desired voltage and a desired frequency for driving the motor (permanent magnet synchronous motor (PMSM)) 2. Thereby, the motor 2 is operated on the basis of the voltage-variable and frequency-variable three-phase AC power supplied by the inverter 52.

In this manner, the three-phase to dq conversion unit 13-2 executes the three-phase to dq conversion process based on the equation 17 on the three-phase AC currents $i_u$, $i_v$, and $i_w$ to generate the d-axis current $i_{d1}$ and the q-axis current $i_{q1}$ advanced from the rotor phase angle θ by the phase correction amount φ. The controller 14 generates the d-axis voltage command $V_{d1}^*$ and the q-axis voltage command $V_{q1}^*$ for allowing the d-axis current $i_{d1}$ and the q-axis current $i_{q1}$ to follow the d-axis current command $i_d^*$ and the input q-axis current command $i_q^*$. Then, the dq to three-phase conversion unit 13-1 generates the three-phase voltage commands $V_u^*$, $V_v^*$, and $V_w^*$ by executing the dq to three-phase conversion process based on the equation 12 on the d-axis voltage command $V_{d1}^*$ and the q-axis voltage command $V_{q1}^*$ advanced from the rotor phase angle θ by the phase correction amount φ. In other words, in the motor control device 1 according to the first embodiment, when the three-phase to dq conversion process using a corrected rotor phase angle by the three-phase to dq conversion unit 13-2 is executed, there occurs "the state of being advanced from the rotor phase angle θ by the phase correction amount φ". In this state, the dq-axis voltage command generation process by the controller 14 is executed, followed by further execution of the dq to three-phase conversion process using a corrected rotor phase angle by the dq to three-phase conversion unit 13-1, as a result of which "the state of being advanced from the rotor phase angle θ by the phase correction amount φ" is cancelled.

Conventionally, permanent magnet synchronous motors (PMSMs) have been controlled through the "flux-weakening control" using a negative d-axis current. However, there has been a problem in that the equation 5 using for the flux-weakening control is complicated and a calculation process takes time. In contrast, the present invention does not use any complicated calculation equation such as the equation 5 specific to the flux-weakening control and uses, as a control parameter, the phase correction amount φ that is used for correcting the rotor phase angle θ to drive and control a permanent magnet synchronous motor (PMSM). Thus, the content of the calculation process is easier than the conventional flux-weakening control, so that calculation process time can be shortened.

Figure 3:
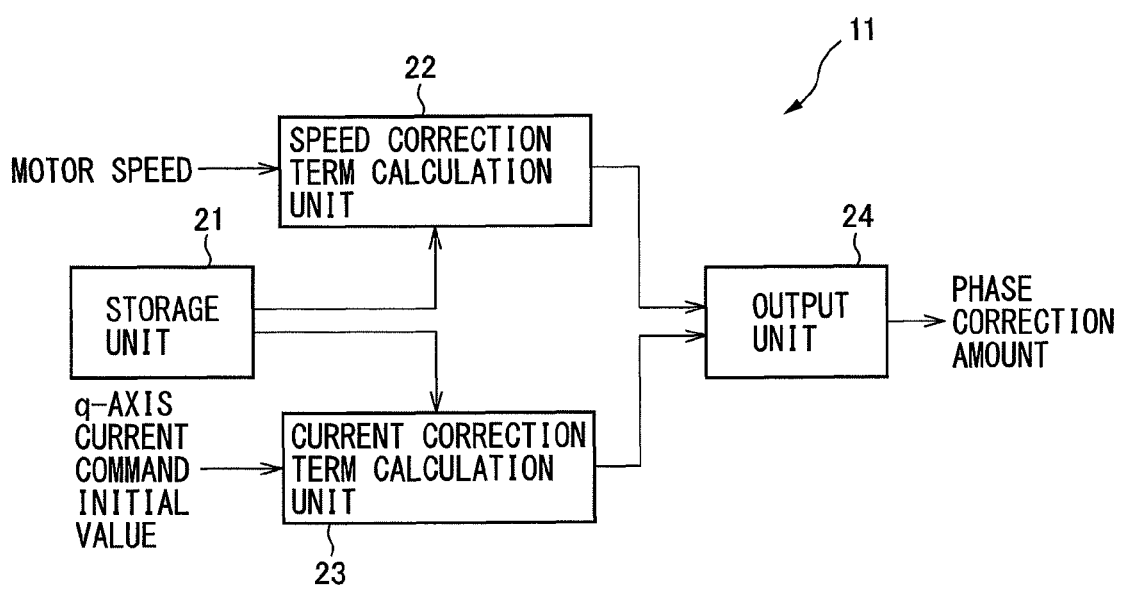
FIG. 3 is a block diagram depicting a phase correction amount calculation unit in the motor control device depicted in FIG. 1.

Next, a description will be given of a specific method for calculating the phase correction amount φ. FIG. 3 is a block diagram depicting a phase correction amount calculation unit in the motor control device depicted in FIG. 1. The phase correction amount calculation unit 11 includes a storage unit 21, a speed correction term calculation unit 22, a current correction term calculation unit 23, and an output unit 24.

The storage unit 21 stores a speed coefficient $N_A$, a first reference speed $N_B$, a phase correction amount limit value $N_L$, a current coefficient $T_A$, and a reference current rate $T_B$ as predetermined parameters.

The speed correction term calculation unit 22 calculates a speed correction term according to an equation 18 where the motor speed detected by the speed detector 16 is represented by N. Specifically, as depicted in the equation 18, the speed correction term calculation unit 22 first subtracts the first reference speed $N_B$ from the motor speed N. Then, the speed correction term calculation unit 22 multiplies a larger value of a resulting value of the subtraction and 0 by the speed coefficient $N_A$. An upper limit of a resulting value of the multiplication is set to the phase correction amount limit value $N_L$. In other words, the speed correction term calculation unit 22 outputs, as a speed correction term, a smaller value of the resulting value of the multiplication and the phase correction amount limit value $N_L$.

$$\text{Speed correction value} = \min[N_A \times \max\{0, (N-N_B)\}, N_L] \quad (18)$$

The current correction term calculation unit 23 calculates a current correction value according to an equation 19 where $T_r$ represents an initial q-axis current command rate that is a percentage of a q-axis current command initial value $i_{q0}^*$ with respect to a maximum current outputtable by the inverter 52 (i.e., a value obtained by dividing the q-axis current command initial value $i_{q0}^*$ by the maximum current outputtable by the inverter 52). Values of the initial q-axis current command rate $T_r$ and the reference current rate $T_B$ are assumed to be in a range of from 0 to 1 where the values thereof are assumed to be 1 when the maximum current outputtable by the inverter 52 flows to the motor 2. In other words, as depicted in an equation 19, the speed correction term calculation unit 22 first extracts a larger value of a value obtained by subtracting the reference current rate $T_B$ from the initial q-axis current command rate $T_r$ and 0. Next, the speed correction term calculation unit 22 multiplies a smaller value of a resulting value of the extraction and 1 by the current coefficient $T_A$ and outputs a resulting value of the multiplication as a current correction term.

$$\text{Current correction value} = T_A \times \min[1, \max\{0, (T_r - T_B)\}] \quad (19)$$

The output unit 24 outputs a value obtained by multiplying the speed correction term and the current correction term together, as the phase correction amount φ.

As can be seen from the equations 18 and 19, the phase correction amount φ becomes a function that uses the motor speed N as an independent variable. In addition, the q-axis current command initial value $i_{q0}^*$ changes moment by moment according to an input acceleration command. Thus, the phase correction amount φ becomes a value that changes depending on magnitudes of the motor speed N and the q-axis current command initial value $i_{q0}^*$. The q-axis current command initial value $i_{q0}^*$ is represented by "$i_{q0}^*$=torque command $T_{cmd} \div K_t$" where $T_{cmd}$ represents torque command and $K_t$ represents torque constant. On the other hand, as depicted in the equation 5, the d-axis current command $i_d^*$ in flux-weakening control includes the angular velocity ω and the q-axis current $i_q$ as variables. Thus, in the present invention, the phase correction amount calculation unit 11 calculates the phase correction amount φ by using a detected motor speed N and the q-axis current command initial value $i_{q0}^*$. The q-axis current command initial value $i_{q0}^*$ is assumed to be a value calculated from the equation 5 where the q-axis current command initial value $i_{q0}^*$ is, for example, 0. In this case, the speed coefficient $N_A$, the first reference speed $N_B$, the phase correction amount limit value $N_L$, the current constant $T_A$, and the reference current rate $T_B$ under a condition where the initial value of the d-axis current command $i_d^*$ is 0 will be appropriately set on the basis of simulations and experiments so that the $i_d^*$ calculated by "$i_{d0}^* \times \sin φ$" becomes a value close to the d-axis current command $i_d^*$ in the flux-weakening control using the equation 5. Setting examples based on simulations will be described later. Each parameter thus set is stored in the storage unit 21. Using the input q-axis current command initial value $i_{q0}^*$, together with the speed coefficient $N_A$, the first reference speed $N_B$, the phase correction amount limit value $N_L$, the current constant $T_A$, and the reference current rate $T_B$ stored in the storage unit 21, a speed correction term and a current correction term are generated according to the equations 18 and 19, and a value obtained by multiplying the speed correction term and the current correction term together is set as the phase correction amount φ.

Under the condition where the initial value $i_{d0}^*$ of the d-axis current command $i_d^*$ is 0 as described above, when the controller tries to generate the q-axis current command $i_q^*$ and the d-axis current command $i_d^*$ after a three-phase to dq conversion process using the phase correction amount φ generated on the basis of the input q-axis current command initial value $i_{q0}{}^*$, the maximum value of the d-axis current command $i_d{}^*$ that can be generated is only "$i_{d0}{}^* \times \sin \phi$". For example, when the q-axis current command initial value $i_{q0}{}^*$ is a value close to 0, the controller 14 cannot generate a large d-axis current command $i_d{}^*$. Thus, more preferably, the initial value $i_{d0}{}^*$ of the d-axis current command $i_d{}^*$ is set not to 0 but to a value dependent on the motor speed N. Accordingly, the motor control device 1 may further include a d-axis current command initial value calculation unit (not shown) for calculating a d-axis current command initial value $i_{d0}{}^*$ including a function that uses the motor speed N as an independent variable. The d-axis current command initial value calculation unit calculates an initial value of the d-axis current command $i_d{}^*$ according to an equation 20 where $I_{DA}$ represents a predetermined d-axis current command initial value coefficient and $I_{DB}$ represents a predetermined second reference speed. In other words, as depicted in the equation 20, the d-axis current command initial value calculation unit first subtracts the second reference speed $I_{DB}$ from the motor speed N. Next, the d-axis current command initial value calculation unit outputs a larger value of a value, which was obtained by multiplying a resulting value of the subtraction and the d-axis current command initial value coefficient $I_{DA}$, and 0, as the initial value $i_{d0}{}^*$ of the d-axis current command $i_d{}^*$ .

$$\text{Initial value of } d\text{-axis current command} = \max\{0, I_{DA} \times (N - I_{DB})\} \quad (20)$$

Next, the above first embodiment and the conventional flux-weakening control will be compared, with reference to simulation results. For both of the motor control device according to the first embodiment and a motor control device using the conventional flux-weakening control, a simulation circuit for driving a permanent magnet synchronous motor (PMSM) with four pole pairs was formed. In the present simulation, respective parameters of the permanent magnet synchronous motor (PMSM) and an AC power supply used were common between the motor control device of the first embodiment and the motor control device using the conventional flux-weakening control. Specifically, a stator interlinkage magnetic flux $\Psi_a$ of the magnet of the permanent magnetic synchronous motor was set to 0.001 [Wb], a stator coil resistance R of one phase was set to 0.57[Ω], a d-axis inductance $L_d$ of one phase was set to 3.2 [mH], and a q-axis inductance $L_q$ of one phase was set to 3.2 [mH]. In addition, the AC power supply was a three-phase AC power supply with 40 [A] and an effective value of 200 [V].

Figure 4A:
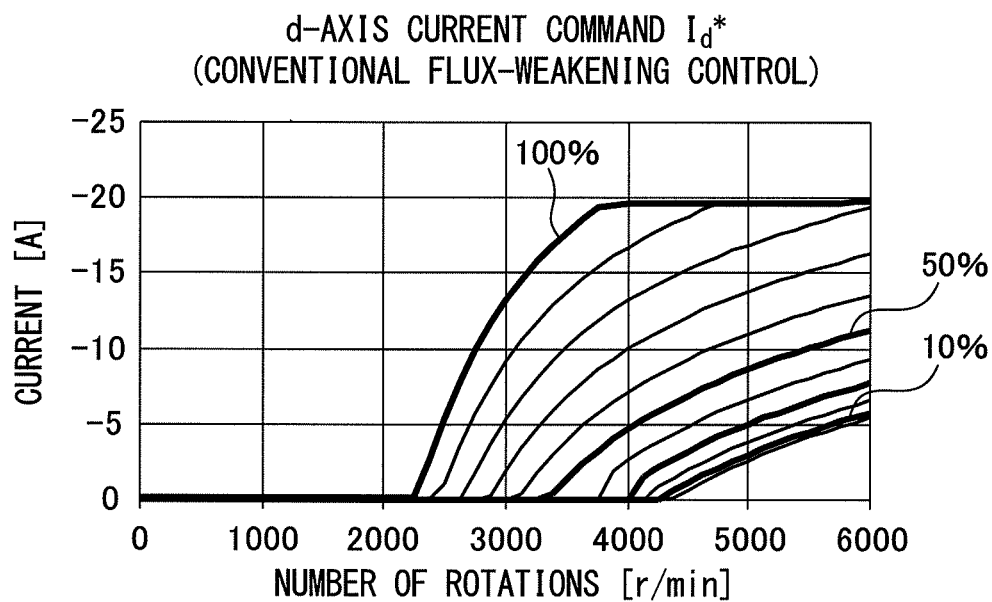
FIG. 4A is a diagram depicting a simulation result of a motor control device using conventional flux-weakening control, the diagram depicting the amount of d-axis current command with respect to the number of rotations of a motor.
Figure 4B:
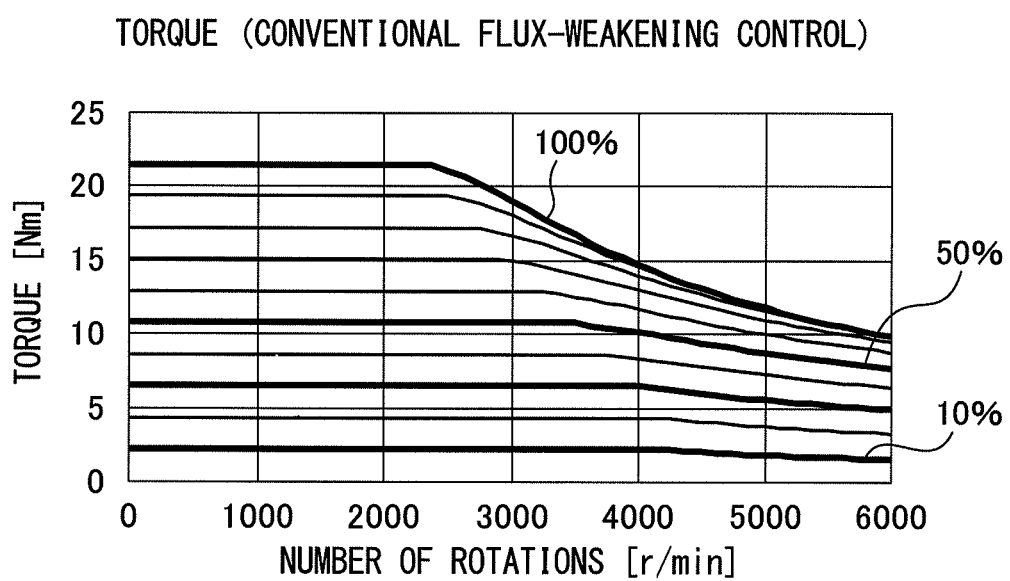
FIG. 4B is a diagram depicting a simulation result of the motor control device using the conventional flux-weakening control, the diagram depicting the amount of torque with respect to the number of rotations of the motor.

FIGS. 4A and 4B are charts depicting simulation results of the motor control device using the conventional flux-weakening control. FIG. 4A depicts the amount of d-axis current command with respect to the number of rotations of the motor, and FIG. 4B depicts the amount of torque with respect to the number of rotations of the motor. In the present simulation, the q-axis current command initial value $i_{q0}{}^*$ was set per 10% from 10 to 100% with respect to a maximum current, and the d-axis current command id* and the torque were calculated on the basis of equations described in the literature "Design and Control of Interior Magnet Synchronous Motor".

Figure 5A:
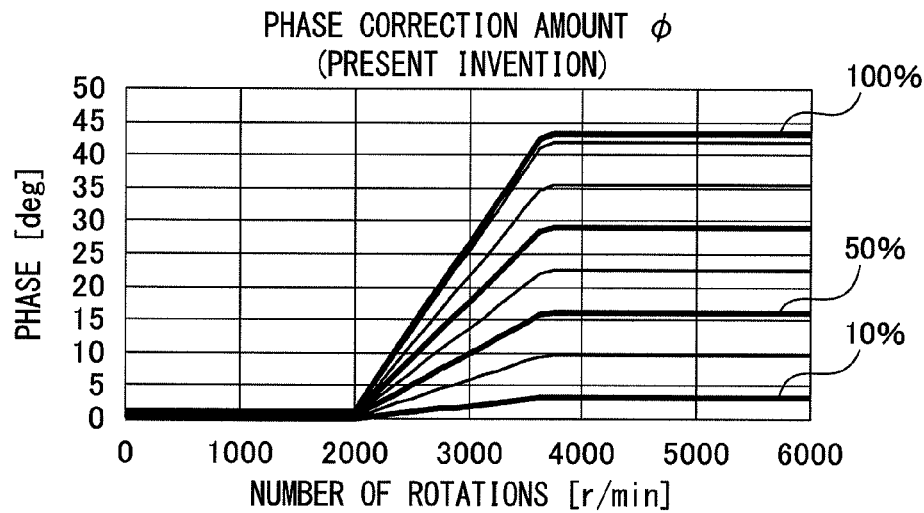
FIG. 5A is a diagram depicting a simulation result of the motor control device according to the first embodiment, the diagram depicting the amount of phase correction.
Figure 5B:
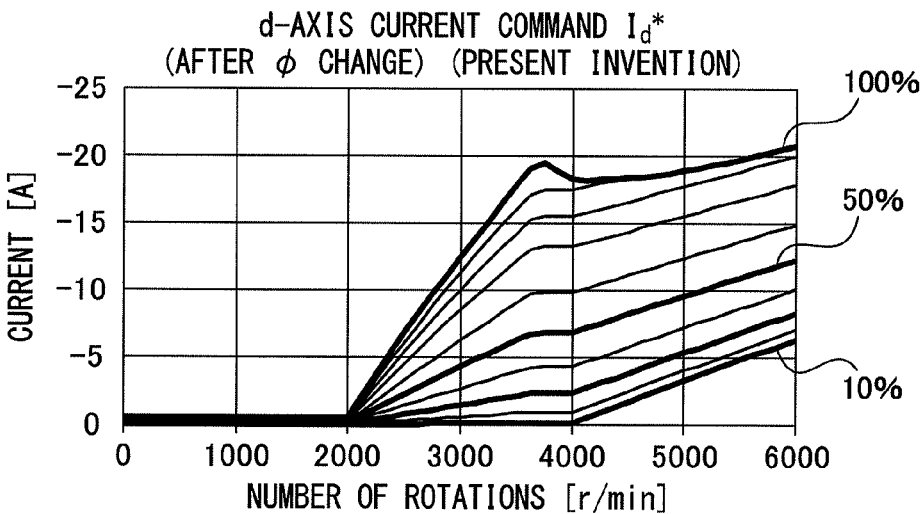
FIG. 5B is a diagram depicting a simulation result of the motor control device according to the first embodiment, the diagram depicting the amount of d-axis current command with respect to the number of rotations of the motor.
Figure 5C:
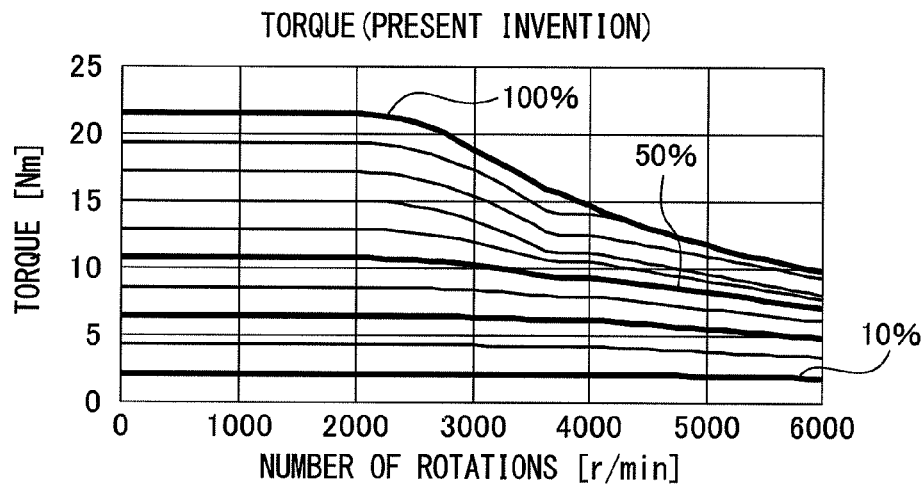
FIG. 5C is a diagram depicting a simulation result of the motor control device according to the first embodiment, the diagram depicting the amount of torque with respect to the number of rotations of the motor.

FIGS. 5A, 5B, and 5C are charts depicting simulation results of the motor control device according to the first embodiment. FIG. 5A depicts the amount of phase correction; FIG. 5B depicts the amount of d-axis current command with respect to the number of rotations of the motor; and FIG. 5C depicts the amount of torque with respect to the number of rotations of the motor. In this simulation as well, the q-axis current command initial value $i_{q0}{}^*$ was set per 10% from 10 to 100% with respect to a maximum current. In fact, the q-axis current command initial value $i_{q0}{}^*$ is a value that changes moment by moment according to an acceleration command, as described above. Each parameter in the first embodiment was appropriately adjusted so that values of the parameters became those close to the simulation results on the conventional flux-weakening control depicted in FIGS. 4A and 4B. For example, the speed coefficient $N_A$ was set to 25.4 [deg/krpm], the first reference speed $N_B$ was set to 2000 [r/min], the phase correction amount limit value $N_L$ was set to 42.2 [deg], the current coefficient $T_A$ was set to 1.5, the reference current rate $T_B$ was set to 0.05, the d-axis current command initial value coefficient $I_{DA}$ was set to 3.1 [A/krpm], and the second reference speed $I_{DB}$ was set to 4000 [rpm], thereby allowing the resulting control characteristics to substantially match those of the conventional flux-weakening control. While the description hereinabove has been given of the parameter setting based on the simulation results, parameter setting may be performed on the basis of experiment results obtainable by constructing an actual device model of a motor control device for driving the permanent magnet synchronous motor to actually drive the permanent magnet synchronous motor.

As described hereinabove, according to the first embodiment, appropriate setting of the parameters allows the control characteristics to become close to those of the conventional flux-weakening control.

Figure 6:
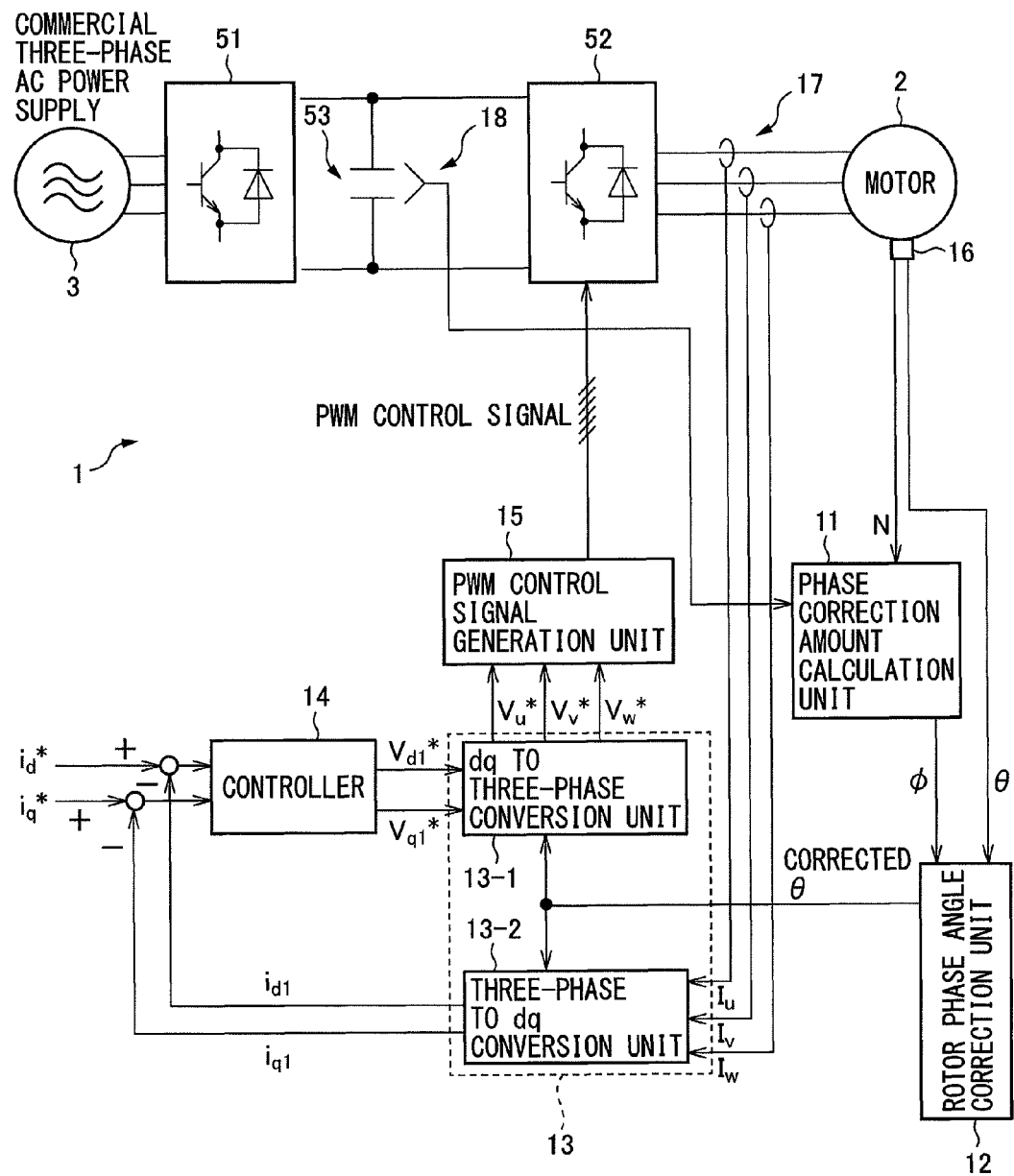
FIG. 6 is a block diagram depicting a motor control device according to a second embodiment of the invention.
Figure 7:
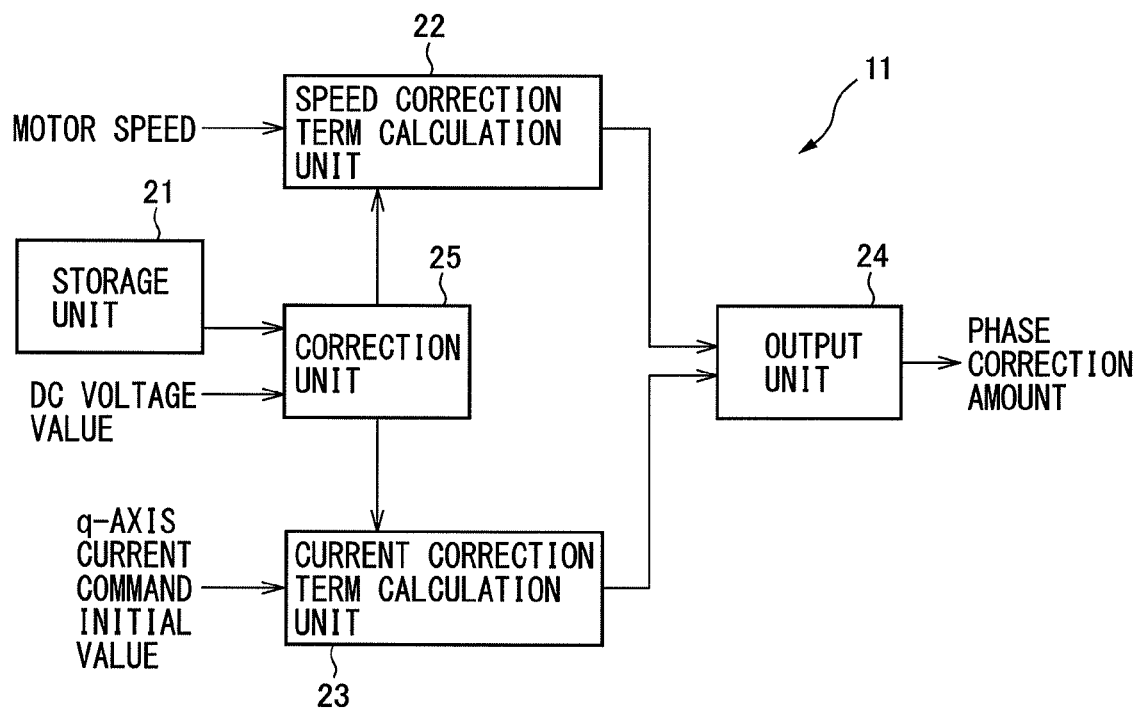
FIG. 7 is a block diagram depicting a phase correction amount calculation unit in the motor control device depicted in FIG. 6.

Next, a second embodiment will be described. FIG. 6 is a block diagram depicting a motor control device according to the second embodiment. In addition, FIG. 7 is a block diagram depicting a phase correction amount calculation unit of the motor control device depicted in FIG. 6. In the second embodiment, the motor control device of the above first embodiment is configured so as to be adaptable to voltage fluctuation on the DC side of the inverter 52 that supplies a drive power for the motor 2.

In general, a DC voltage of a DC link connecting the rectifier 51 and the inverter 52 (i.e., a DC voltage of the DC capacitor 53) changes depending on voltage fluctuation of the AC power supply 3, a voltage drop that occurs in the rectifier 51 and the inverter 52, the magnitude of power regenerated from a motor side to the DC side by the inverter 52, and the like. Thus, in the second embodiment, a DC voltage value $V_{dc}$ detected by a voltage detector 18 on the DC side of the inverter 52 is fed back to the phase correction amount calculation unit 11 to change the d-axis current command initial value $i_{d0}{}^*$ according to the current voltage value $V_{dc}$. Specifically, a correction unit 25 provided in the phase correction amount calculation unit 11 uses the feedback DC voltage value $V_{dc}$ to correct the speed coefficient $N_A$, the first reference speed $N_B$, and the phase correction amount limit value $N_L$, respectively, read out from the storage unit 21. In addition, the storage unit 21 may further store a reference voltage $V_B$ as a predetermined parameter. Circuit constituent elements other than the phase correction amount calculation unit 11 and the voltage detector 18 are the same as those depicted in FIGS. 1 and 3. Thus, the same circuit constituent elements are denoted by the same reference signs and a detailed description thereof will be omitted. Hereinbelow, the phase correction amount calculation unit 11 will be described in more detail.

The correction unit 25 corrects the speed coefficient $N_A$ read out from the storage unit 21 according to an equation 21 to generate a corrected speed coefficient $N_A'$. In the equation 21, $N_{AV}$ represents "a voltage-dependent coefficient regarding speed coefficient" stored as a predetermined parameter in the storage unit 21.

$$N_A' = N_A - (V_{dc} - B_B) \times N_{AV} \quad (21)$$

The correction unit 25 corrects the first reference speed $N_B$ read out from the storage unit 21 according to an equation 22 to generate a corrected first reference speed $N_B'$. In the equation 22, $N_{BV}$ represents "a voltage-dependent coefficient regarding the first reference speed" stored as a predetermined parameter in the storage unit 21.

$$N_B' = N_B - (V_{dc} - V_B) \times N_{BV} \quad (22)$$

The correction unit 25 corrects the phase correction amount limit value $N_L$ read out from the storage unit 21 according to an equation 23 to generate a corrected phase correction amount limit value $N_L'$. In the equation 23, $N_{LV}$ represents "a voltage-dependent coefficient regarding phase correction amount limit value" stored as a predetermined parameter in the storage unit 21.

$$N_L' = N_L - (V_{dc} - V_B) \times N_{LV} \quad (23)$$

The speed correction term calculation unit 22 calculates a speed correction term according to the equation 18 by using the corrected speed coefficient $N_A'$, the corrected first reference speed $N_B'$, and the corrected phase correction amount limit value $N_L'$. The current correction term calculation unit 23 calculates a current correction term according to the equation 19. The output unit 24 outputs, as the phase correction amount φ, a value obtained by multiplying the speed correction term and the current correction term together. The above-mentioned corrected $N_A'$, corrected first reference speed $N_B'$, and corrected phase correction amount limit value $N_L'$ are functions each using, as an independent variable, the current voltage value $V_{dc}$ detected by the voltage detector 18 on the DC side of the inverter 52. Accordingly, the phase correction amount φ output from the output unit 24 becomes adapted to voltage fluctuation of the DC side of the inverter 52. In this manner, the second embodiment generates the phase correction amount φ adapted to voltage fluctuation on the DC side of the inverter 52 and thus can make the control characteristics close to those of the conventional flux-weakening control more precisely than the first embodiment. The coefficients $N_{AV}$, $N_{BV}$, and $N_{LV}$ and the reference voltage $V_B$ to be stored in the storage unit 21 under the condition where the initial value of the d-axis current command $i_d^*$ is 0 may be appropriately set on the basis of simulations and experiments so as to result in values close to the d-axis current command $i_d^*$ in flux-weakening control using the equation 5. Setting examples based on simulations will be described later.

In addition, as already described, in the above first embodiment, the d-axis current command unit has calculated the initial value $i_{d0}^*$ of the d-axis current command $i_d^*$ according to the equation 20 where $I_{DA}$ represented a predetermined d-axis current command initial value coefficient and $I_{DB}$ represented a predetermined second reference speed. However, in the second embodiment, the second reference speed $I_{DB}$ in the equation 20 may also be corrected using the fed-back DC voltage value $V_{dc}$. In this case, the correction unit 25 corrects the second reference speed $I_{DB}$ according to an equation 24 to generate a corrected second reference speed $N_{DB}'$. In the equation 24, $I_{DBV}$ represents "a voltage-dependent coefficient regarding d-axis current command initial value" stored as a predetermined parameter in the storage unit 21.

$$I_{DB}' = I_{DB} - (V_{dc} - V_B) \times I_{DBV} \quad (24)$$

In this manner, by setting the second reference speed so as to be adaptable even to voltage fluctuation of the DC side of the inverter 52 on the basis of the equation 24, the control characteristics can be made more similar to those of the conventional flux-weakening control.

Next, a comparison between the above-described second embodiment and the conventional flux-weakening control will be described on the basis of simulation results. In the present simulation, for both of the motor control device according to the second embodiment and a motor control device using the conventional flux-weakening control, there was formed a simulation circuit for driving a permanent magnet synchronous motor (PMSM) with four pole pairs. In addition, as with the simulation of the first embodiment, the respective parameters of the permanent magnet synchronous motor (PMSM) and the AC power supply used were common between the motor control device according to the second embodiment and the motor control device using the conventional flux-weakening control. Specifically, a stator interlinkage magnetic flux $\Psi_a$ of the magnet of the permanent magnetic synchronous motor was set to 0.001 [Wb], a stator coil resistance R of one phase was set to 0.57[Ω], a d-axis inductance $L_d$ of one phase was set to 3.2 [mH], and a q-axis inductance $L_q$ of one phase was set to 3.2 [mH]. In addition, the AC power supply was a three-phase AC power supply with 40 [A] and an effective value of 200 [V].

Figure 8A:
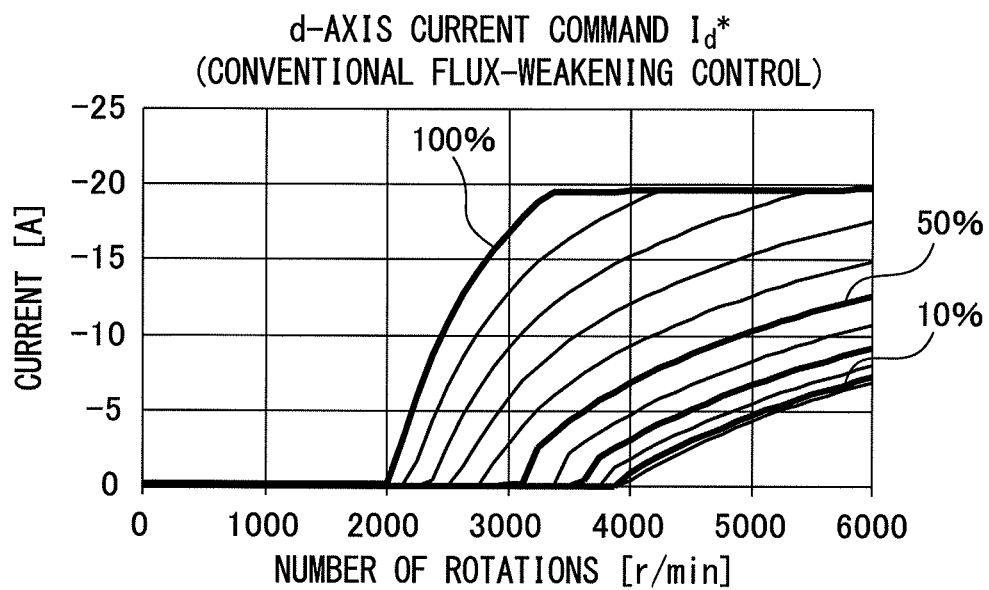
FIG. 8A is a diagram depicting a simulation result of a motor control device using the conventional flux-weakening control, the diagram depicting the amount of d-axis current command with respect to the number of rotations of a motor.
Figure 8B:
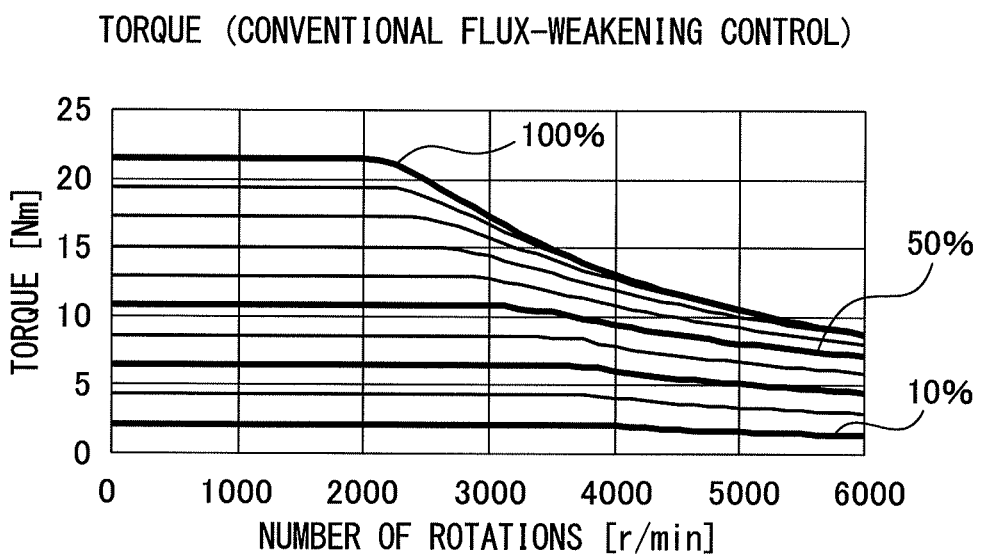
FIG. 8B is a diagram depicting a simulation result of the motor control device using the conventional flux-weakening control, the diagram depicting the amount of d-axis current command with respect to the number of rotations of the motor.

FIGS. 8A and 8B are diagrams depicting simulation results of the motor control device using the conventional flux-weakening control. FIG. 8A depicts the amount of d-axis current command with respect to the number of rotations of the motor, and FIG. 8B depicts the amount of torque with respect to the number of rotations of the motor. In the present simulation, the q-axis current command initial value $i_{q0}^*$ was set per 10% from 10 to 100% with respect to a maximum current and the d-axis current command $i_d^*$, and the DC voltage $V_{dc}$ that is detected by the voltage detector 18 was changed from 282 [V] up to 260 [V] to calculate the d-axis current command $i_d^*$ and torque on the basis of the equations described in the literature "Design and Control of Interior Magnet Synchronous Motor".

Figure 9A:
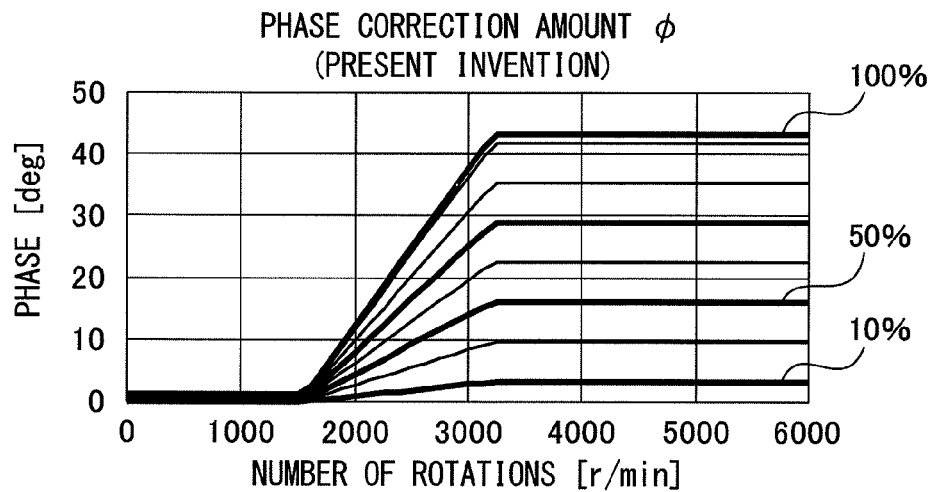
FIG. 9A is a diagram depicting a simulation result of the motor control device according to the second embodiment, the diagram depicting the amount of phase correction.
Figure 9B:
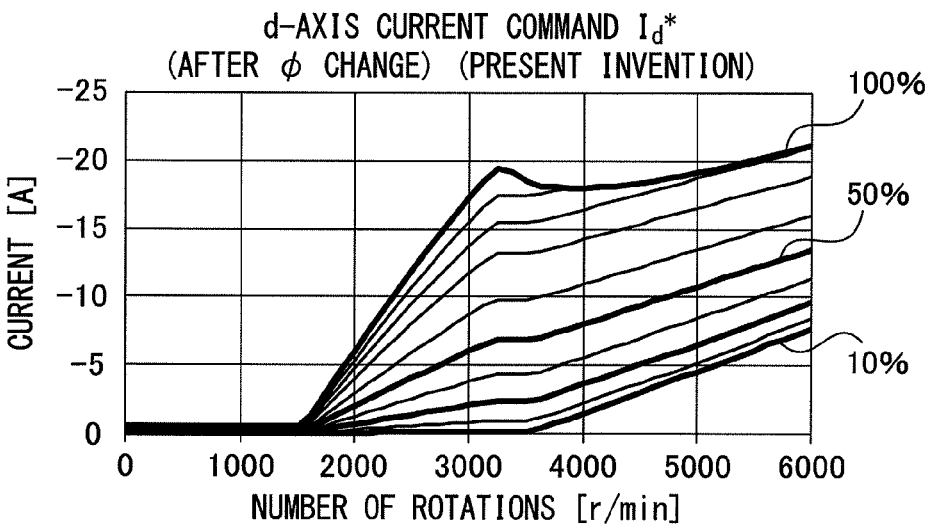
FIG. 9B is a diagram depicting a simulation result of the motor control device according to the second embodiment, the diagram depicting the amount of d-axis current command with respect to the number of rotations of the motor.
Figure 9C:
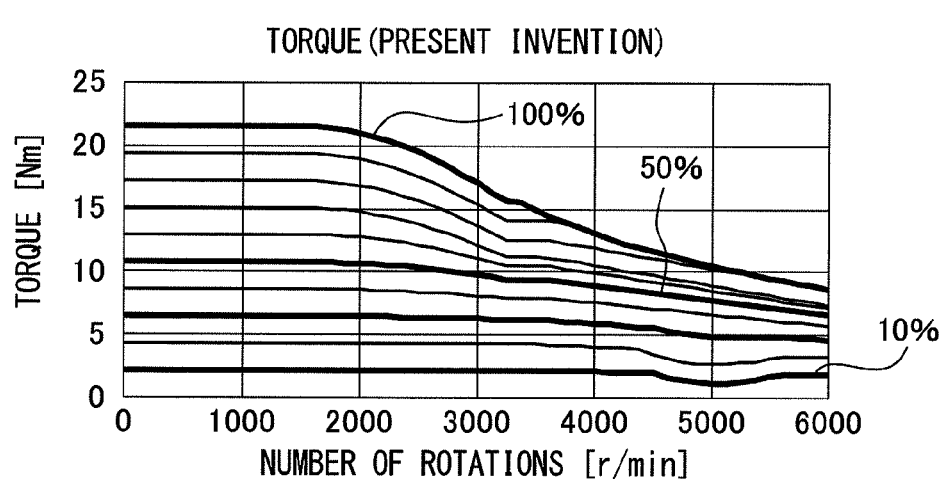
FIG. 9C is a diagram depicting a simulation result of the motor control device according to the second embodiment, the diagram depicting the amount of torque with respect to the number of rotations of the motor.
Figure 10:
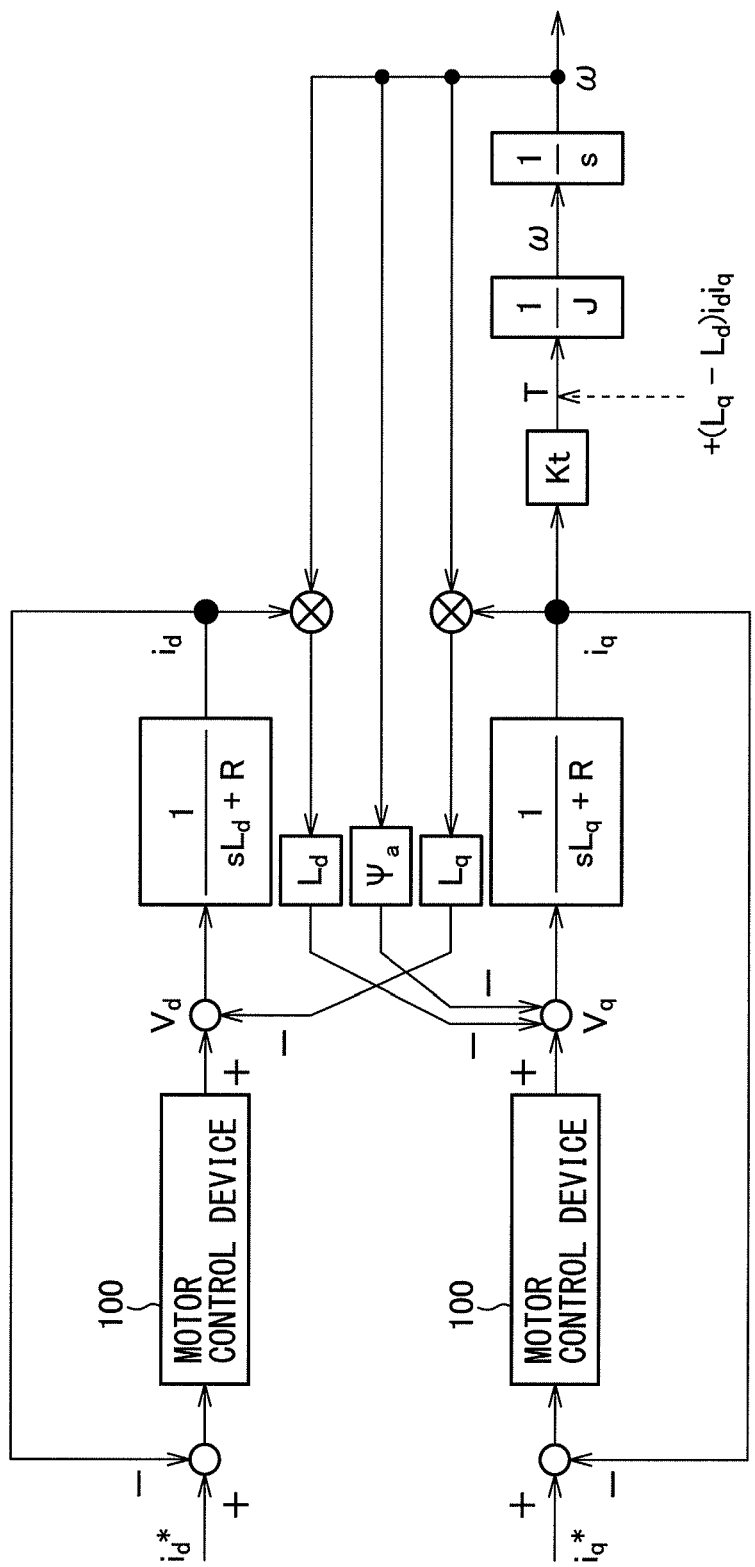
FIG. 10 is a block diagram depicting a control loop of a typical motor control device for controlling a three-phase AC motor by using dq-three-phase coordinate conversion.
Figure 11:
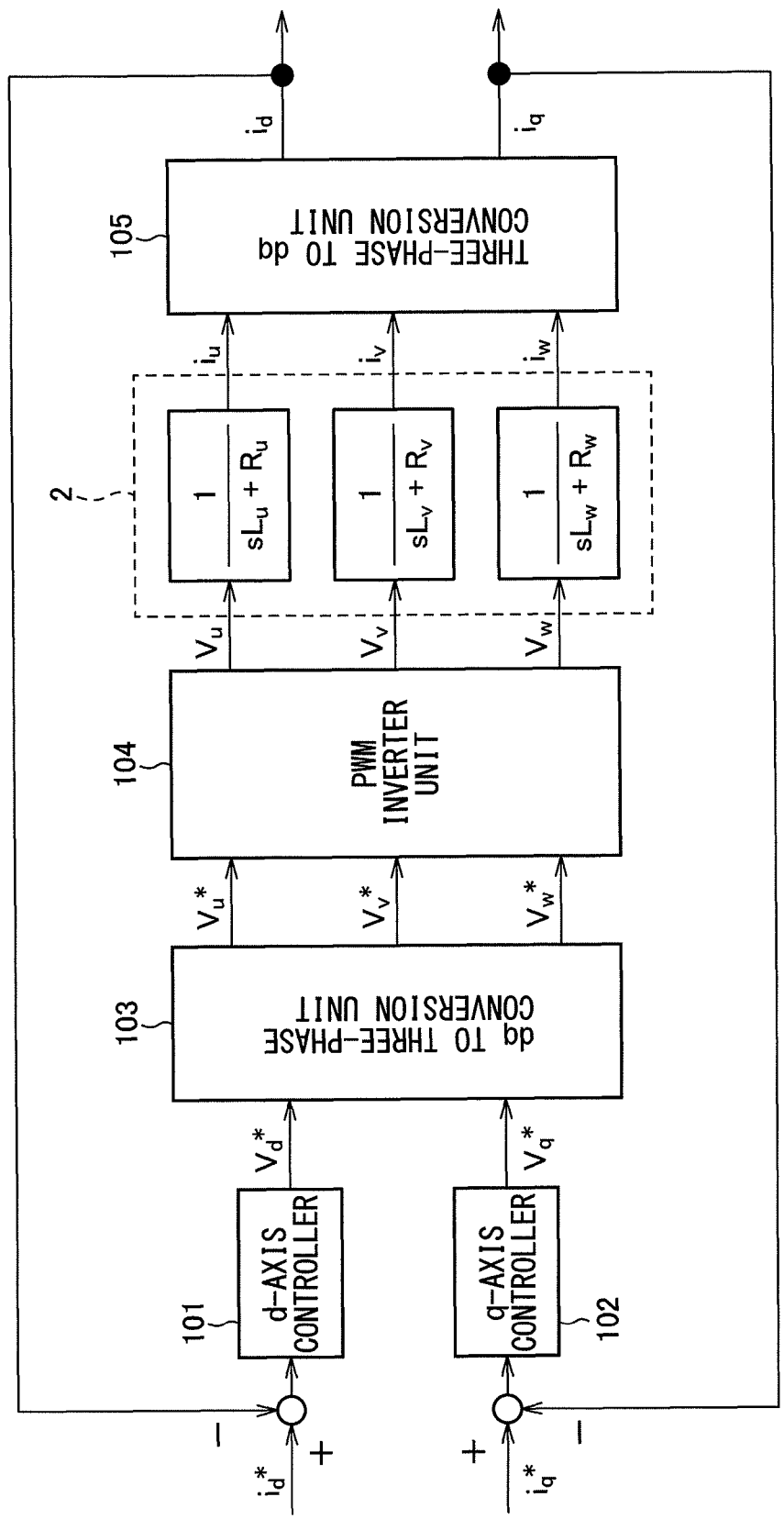
FIG. 11 is a block diagram illustrating a dq-three-phase coordinate conversion process in a typical motor control device.

FIGS. 9A, 9B, and 9C are charts depicting simulation results of the motor control device according to the second embodiment. FIG. 9A depicts the amount of phase correction; FIG. 9B depicts the amount of d-axis current command with respect to the number of rotations of the motor; and FIG. 9C depicts the amount of torque with respect to the number of rotations of the motor. In this simulation as well, the q-axis current command initial value $i_{q0}^*$ was set per 10% from 10 to 100% with respect to a maximum current, and the DC voltage $V_{dc}$ that is detected by the voltage detector 18 was changed from 282 [V] up to 260 [V]. The respective parameters in the second embodiment were appropriately adjusted so as to result in values close to the simulation results on the conventional flux-weakening control depicted in FIGS. 8A and 8B. For example, when the voltage-dependent coefficient $N_{AV}$ regarding speed coefficient was set to 0 [deg/krpm/V], the voltage-dependent coefficient $N_{BV}$ regarding first reference speed was set to 30.7 [rpm/V], the voltage-dependent coefficient $N_{LV}$ regarding phase correction amount limit value was set to 0 [deg/V], the coefficient $I_{DBV}$ was set to 30.7 [rpm/V], and parameters other than those were set to be the same as those in the first embodiment, the simulation result was able to be made to substantially match the control characteristics of the conventional flux-weakening control. While the description hereinabove has been given of the parameter setting based on the simulation results, parameter setting may be performed on the basis of experiment results obtainable by constructing an actual device model of a motor control device for driving the permanent magnet synchronous motor to actually drive the permanent magnet synchronous motor.

As described hereinabove, according to the second embodiment, appropriate setting of the parameters allows the control characteristics to become close to those of the conventional flux-weakening control.

In general, there is a time delay between a command and an actual output in a current control loop of the motor control device 1. Then, in a first modification of the first and the second embodiments described above, by further adding or subtracting, to or from the corrected rotor phase angle, a phase angle corresponding to the time delay in the current control loop that controls so that a current that flows to the motor 2 follows a current command, there may be calculated a new corrected rotor phase angle that is used for coordinate conversion by the coordinate conversion unit 13. Thereby, the control characteristics can be made more similar to those of the conventional flux-weakening control.

In addition, it is generally known that there occurs a problem in that when a current to be supplied to an AC motor is increased, magnetic saturation occurs in a magnetic circuit of the motor, thereby causing torque constant reduction despite of the large current supply to make it difficult to obtain a desired torque. In order to solve the problem, there is a technique for maximizing motor torque by advancing the phase of a q-axis current command, as described in Japanese Laid-open Patent Publication No. H9-298899. Thus, in a second modification of the first and the second embodiments described above, by further adding or subtracting, to or from the corrected rotor phase angle, a phase angle corresponding to a phase advance of the q-axis current command necessary to maximize the torque of the motor 2, there may be calculated a new corrected rotor phase angle that is used for coordinate conversion by the coordinate conversion unit 13. Thereby, the control characteristics can be made more similar to those of the conventional flux-weakening control.

Furthermore, the first and the second modifications may be achieved in combination with each other. Specifically, by further adding or subtracting, to or from the corrected rotor phase angle, both of the phase angle corresponding to the time delay in the current control loop that controls so that the current that flows to the motor 2 follows the current command and the phase angle corresponding to the phase advance of the q-axis current command necessary to maximize the torque of the motor, there may be calculated a new corrected rotor phase angle that is used for the coordinate conversion by the coordinate conversion unit 13. Thereby, the control characteristics can be made more similar to those of the conventional flux-weakening control.

The above-described phase correction amount calculation unit 11, the rotor phase angle correction unit 12, the coordinate conversion unit 13 (the dq to three-phase conversion unit 13-1 and the three-phase to dq conversion unit 13-2), the controller 14, the PWM control signal generation unit 15, the speed correction term calculation unit 22, the current correction term calculation unit 23, the output unit 24, and the correction unit 25 may be constructed, for example, in a software program format or may be constructed by a combination of various electronic circuits and a software program. For example, when these means are constructed in the software program format, the processor of the motor control device 1 operates according to the software program, so that functions of the above-described respective units are achieved. In addition, the present invention can be applied by additionally installing a software program relating to these means of an existing motor control device into the processor of the motor control device.

What is claimed is:

1. A motor control device for controlling a three-phase AC motor by using dq-three-phase coordinate conversion, the motor control device comprising:
a phase correction amount calculation unit for calculating a phase correction amount by using a detected motor speed and a q-axis current command initial value, which is a value obtained by dividing the torque command by the torque constant;
a rotor phase angle correction unit for adding or subtracting the phase correction amount to or from a detected rotor phase angle of the motor to calculate a corrected rotor phase angle; and
a coordinate conversion unit for performing coordinate conversion between parameters on a dq coordinate system and parameters on a three-phase coordinate system on a basis of the corrected rotor phase angle, wherein
the phase correction amount calculation unit comprises a storage unit for storing a speed coefficient $N_A$, a first reference speed $N_B$, a phase correction amount limit value $N_L$, a current coefficient $T_A$, and a reference current rate $T_B$ as predetermined parameters; a speed correction term calculation unit for calculating a speed correction term on a basis of:

$$\text{Speed correction value} = \min[N_A \times \max\{0,(N-N_B)\}, N_L]$$

where N represents the motor speed;
a current correction term calculation unit for calculating a current correction term on a basis of:

$$\text{Current correction value} = T_A \times \min[1, \max\{0,(T_r-T_B)\}]$$

where $T_r$ represents an initial q-axis current command rate that is a percentage of a q-axis current command initial value with respect to a maximum current outputtable by an inverter that converts DC power into AC power to supply the AC power as a drive power for the motor; and
an output unit for outputting, as the phase correction amount, a value obtained by multiplying the speed correction term and the current correction term together.

2. The motor control device according to claim 1, wherein the storage unit further stores a reference voltage as a predetermined parameter, and the phase correction amount calculation unit comprises a correction unit for correcting the speed coefficient, the first reference speed, and the phase correction amount limit value, respectively, read out from the storage unit, by using a DC voltage value detected on a DC side of the inverter and the reference voltage pre-stored in the storage unit.

3. The motor control device according to claim 1, further comprising a d-axis current command initial value calculation unit for calculating a d-axis current command initial value comprising a function that uses the motor speed as an independent variable.

4. The motor control device according to claim 3, wherein the d-axis current command initial value calculation unit calculates the d-axis current command initial value on a basis of:

$$\text{Initial value of } d\text{-axis current command} = \max\{0, IDA \square (N-IDB)\}$$

where IDA represents a predetermined d-axis current command initial value coefficient and IDB represents a predetermined second reference speed.

5. The motor control device according to claim 1, wherein the rotor phase angle correction unit further adds or subtracts, to or from the corrected rotor phase angle, a phase angle corresponding to a time delay in a current control loop that controls so that a current that flows to the motor follows a current command, a phase angle corresponding to a phase advance of a q-axis current command necessary to maximize torque of the motor, or both of the phase angles to calculate a new corrected rotor phase angle that is used for the coordinate conversion by the coordinate conversion unit.

* * * * *